2 Sheets—Sheet 1.
G. H. PERKINS.
Machine for Applying Flux to Can.
No. 203,073. Patented April 30, 1878.
Fig. 1
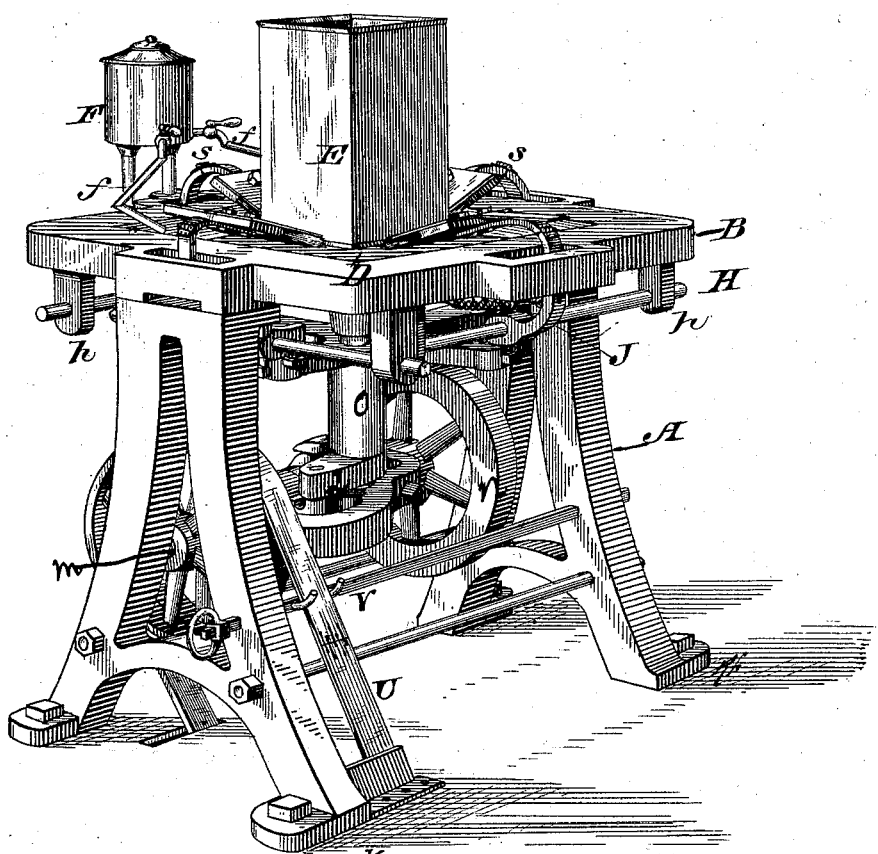
Fig. 2
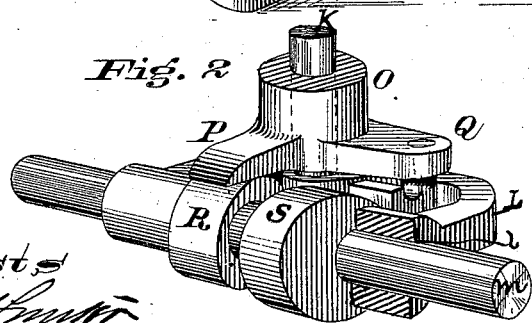
Fig. 5.
Attest:
Phil Smith
John Tolley Jr
Inventor.
George H. Perkins
By his Attorneys,
W. C. Strawbridge,
J. Bonsall Taylor.
N. PETERS, PHOTO-LITHOGRAPHER, WASHINGTON, D.C.

G. H. PERKINS.  
Machine for Applying Flux to Can.
2 Sheets—Sheet 2.
No. 203,073. Patented April 30, 1878.
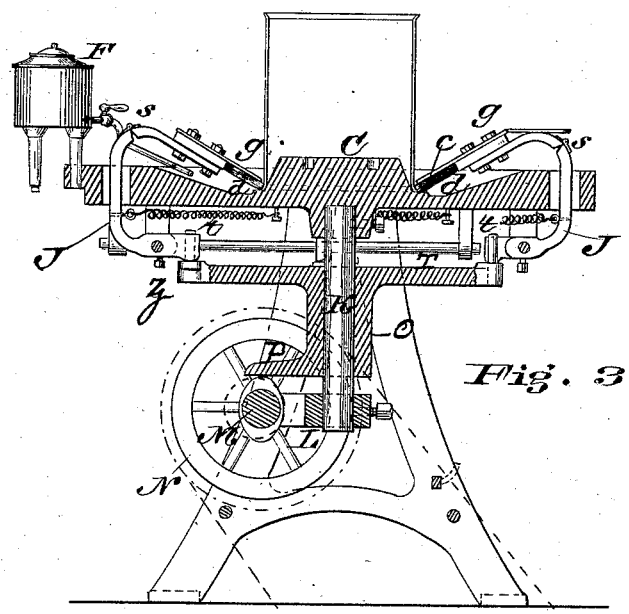
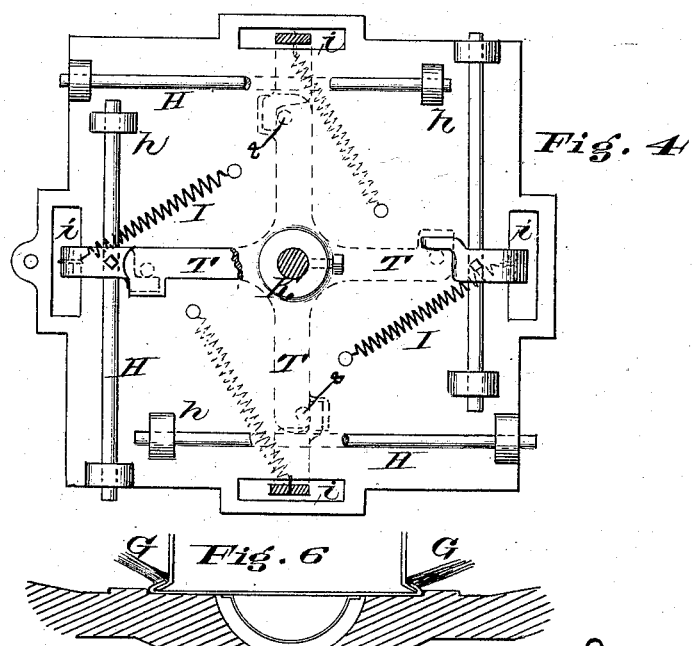
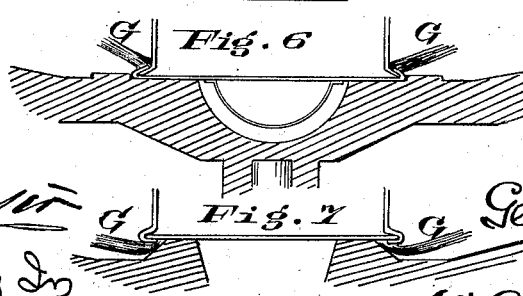
Attest:  
John Dolley Jr
Inventor:  
George H. Perkins  
By his Attorney

UNITED STATES PATENT OFFICE.

GEORGE H. PERKINS, OF PHILADELPHIA, PENNSYLVANIA, ASSIGNOR OF A PART OF HIS RIGHT TO JOSEPH LE COMTE, OF NEW YORK, N. Y., AND THE ATLANTIC REFINING COMPANY, OF PHILADELPHIA, PA.

IMPROVEMENT IN MACHINES FOR APPLYING FLUX TO CANS.

Specification forming part of Letters Patent No. 203,073, dated April 30, 1878; application filed February 23, 1878.

*To all whom it may concern:*

Be it known that I, GEORGE H. PERKINS, of the city and county of Philadelphia, in the State of Pennsylvania, have invented a new and useful Machine for Applying Flux to Cans, of which I do hereby declare the following to be a full, clear, and precise description, and sufficient to enable those skilled in the art to which it appertains to make and use my said invention, reference being had to the accompanying drawings, which form part of this specification.

My invention is especially designed for use in the manufacture of metal cans, vessels, cases, and the like, having for its object the provision of an automatic mechanism which shall take the place of hand-labor in the process of applying the ordinary liquid or other fluxes to the seams or joints of sheet or other metal cans previous to the application of solder to the same.

It consists substantially in the machine hereinafter described and claimed.

Of the drawings, Figure 1 is a view, in perspective, of a machine embodying my invention, and adapted to apply flux to a four-sided can-body, the latter being represented in place upon the form; Fig. 2, a detailed view, in perspective, of the lifting and twisting cams, their shaft, and the frame in which they are hung, showing the cam-toes and a portion of the sliding sleeve; Fig. 3, a central sectional elevation of the entire machine; Fig. 4, a bottom plan of the table from beneath, showing the respective position of the goose-necks, sliding rocker-shafts, springs, and radial arms; Fig. 5, a detailed view, in perspective, of the foot of one of the goose-necks, showing the adjustment of the radial arms and shifter-pins with regard thereto; Figs. 6 and 7, sectional detailed views of modified forms of table.

Similar letters of reference indicate corresponding parts wherever used.

Referring to the drawings, the following is a description of the construction of a machine embodying my invention:

A is the stand or frame-work, and B the fluxing-table, of a machine adapted to apply flux to a four-sided can. The face or top of the table is tank-shaped—that is to say, is channeled out at D about a central conical form, C, the base of which is of the exact size and plan of the edges of the can-body to which it is desired to apply the flux. Surrounding the form C is a ledge, c, upon which the body of the can, when placed over the form, settles down, the pyramidal shape of the form facilitating its easy and accurate application.

d is the gutter surrounding the ledge c, to hold flux. E is the body of the can in place for fluxing. F is the flux-reservoir, from which, through the pipes f, the flux is fed to the gutter of the tank. G are the flux-applying brushes; g, the bridles upon the same. The brushes are preferably elongated, and each of about the width of the sides of the can. They are set upon the upper ends of jointed rocking goose-necks J, which latter, keyed to sliding rocker-shafts H, playing through bearings h, depending from beneath the table, pass up from beneath through slots j in the table, being controlled and at rest, kept over to one side by coiled springs I, connecting them to the table or frame.

The goose-necks are jointed or hinged at s, in such manner that the weight of the portions thereof nearest the brush and of the brushes keeps the latter constantly down on the table, in the tank and gutter, during the whole stage of oscillation and reciprocation.

The brushes are actuated by the following mechanism: K is a rigid stem, depending from beneath the center of the table, and provided at its bottom extremity with a horizontal branching frame, L, having bearings l, in which is journaled the driving-shaft M, provided with balance-wheel N and tight and loose pulleys m m', from the belt U of which the whole mechanism is driven. V is the belt-shifter rod. O is a sliding sleeve, surrounding and sliding upon the stem K, the lower extremity of which sleeve is formed into cam-toes P and Q. Upon the driving-shaft M, above referred to, are keyed a lifting-cam, R, adapted to lift and drop the toe P and sliding sleeve, and a twisting-cam, S, adapted to deflect the toe Q, and so twist or partially rotate the sliding sleeve, the adjustment being such that the action of the two cams is alternate. The upper extremity of the sliding sleeve is provided with four even-distanced horizontal radial arms, T, the outer ends of which extend beneath the feet $z$ of the rocking goose-necks J, and are provided with upright shifter-pins $t$, which bear against the sides of said feet $z$.

Such being the construction of the mechanism which actuates the brushes, its action is as follows: At rest before starting, the several coiled springs keep the rocking goose-necks and brushes and the sliding rocker-shafts, to which they are respectively attached, drawn over to one side, each of said brushes being thus at one side of the can-body which they respectively face, the brushes resting against the edges of the can. The belt being thrown upon the driving-pulley, the driving-shaft and its cams are put in motion, and as the twisting-cam S encounters and deflects the toe Q, rotating the sleeve O and radial arms T, the arms, by their shifter-pins $t$, push the goose-necks J, sliding rocker-shafts H, and brushes G across the width of the sides of the can-body, over the edges thereof, expanding the controlling-springs I. As, then, the lifting-cam R, after the action of the twisting-cam S, encounters and elevates the toe P, sliding sleeve, and radial arms, the arms, tilting up the feet of the goose-necks, oscillate the latter, with their brushes, away from the edges of the can-body, and in so doing cause the brushes to dip through the flux-gutter $d$ and resupply themselves with flux. When, finally, the lifting-cam R allows the sleeve to drop, the springs, which, up to this stage in the action, have merely steadied the throw of the brushes, recoiling, reciprocate the goose-necks, brushes, and sliding rocker-shafts back to their first position, such action being made possible by an adjustment of the cams which allows an interval after the drop of the sleeve before the next rotation thereof.

It is thus clearly manifest that a constant and even action of the brushes into the flux and against the edges of the can-body is effected.

I have specified and represented a machine adapted for use with a four-sided can; but it is obvious that by a simple adaptation the brushes and their connections may be so increased or diminished in number as to adapt them for use with a three-sided or polygonal can of more sides than four.

In Fig. 6 is represented a modified form of table, provided with a recess, to take in the handle of a can when the flux is being applied to the sides of the joint of a can, the head of which has been seamed in place.

In Fig. 7 a further modified form of table adapted to secure the application of the flux to the face of the bottom or top of the can is shown.

Having thus described my invention, I claim and desire to secure by Letters Patent of the United States—

1. In an organized machine for applying flux to metal cans, a series of flux-applying brushes, G, arranged to face the sides of the can-body to be coated, and adapted to be reciprocated across the edges thereof, substantially as described.

2. In combination with the fluxing-table B, adapted to receive the can-body to be coated and to hold the flux, a series of flux-applying brushes, G, operated as described, and arranged to project into the tank-area of the table, substantially as described.

3. The combination, in an organized machine for applying flux to metal cans, with a series of flux-applying brushes, G, of mechanism, cams R and S, sliding sleeve O, rocker-shaft H, and goose-necks J, for oscillating and reciprocating the same, substantially as described.

4. As a composite device for supporting the brushes G in such a manner that they project into the tank-area of the table, and are permitted to oscillate into the flux-gutter $d$ thereof, and to reciprocate across the sides of the can-body, the goose-necks J and sliding rocker-shafts H, arranged and operating substantially as set forth.

5. As a composite device for both oscillating and reciprocating the brushes G, the following instrumentalities in combination, viz: the sliding sleeve O, provided with radial arms T, engaging the goose-necks J, and with toes P and Q, and the cams R and S rotating against said toes, the whole organized and operating substantially as shown and described.

6. As a device for oscillating the brushes G by means of the goose-necks J and rocker-shafts H, the sliding sleeve O, provided with arms T, acting beneath the feet $z$ of the goose-necks, and adapted to be lifted and dropped by means of the lifting-cam R, substantially as described.

7. As a device for reciprocating the brushes G by means of the goose-necks J and sliding rocker-shafts H, the sliding sleeve O, provided with arms T, acting, by means of shifter-pins $t$, sidewise against the feet $z$ of the goose-necks, and adapted to be partially rotated by means of the twisting-cam S, substantially as described.

In testimony whereof I have hereunto signed my name this 12th day of February, A. D. 1878.

GEO. H. PERKINS.

In presence of—
J. BONSALL TAYLOR,
WM. C. STRAWBRIDGE.